United States Patent [19]

Van Der Lely

[11] 3,878,956

[45] Apr. 22, 1975

[54] TRANSPORT DEVICES

[76] Inventor: Cornelis Van Der Lely, 7 Bruschenrain, Zug, Switzerland

[22] Filed: Aug. 31, 1972

[21] Appl. No.: 285,138

[52] U.S. Cl. ............... 214/501; 214/512; 214/515
[51] Int. Cl. .............................................. B60p 1/04
[58] Field of Search .... 214/515, 512, 516, 517:501, 214/505; 280/89 R; 298/17 R

[56] References Cited
UNITED STATES PATENTS

| 1,316,735 | 9/1919 | Olds | 280/438 R X |
| 3,135,407 | 6/1964 | Back | 214/515 |
| 3,300,070 | 1/1967 | Schwartz | 298/17 R X |
| 3,398,984 | 8/1968 | Ajero | 180/89 R X |
| 3,520,433 | 7/1970 | Blackburn | 214/515 |
| 3,545,635 | 12/1970 | Montan | 214/515 |

Primary Examiner—Albert J. Makay
Attorney, Agent, or Firm—Mason, Mason & Albright

[57] ABSTRACT

A transportable device includes a tractor having a forward cabin displaceably mounted on the front and a loading area with lifting cylinders located to the rear, over the tractor's wheels. A separate frame with retractable ground support members and a rotatable frame support can be coupled to the loading area to afford a loading surface for implements to be attached and operated. The controls for the implements and lifting cylinders are located in the driver's cabin.

13 Claims, 5 Drawing Figures

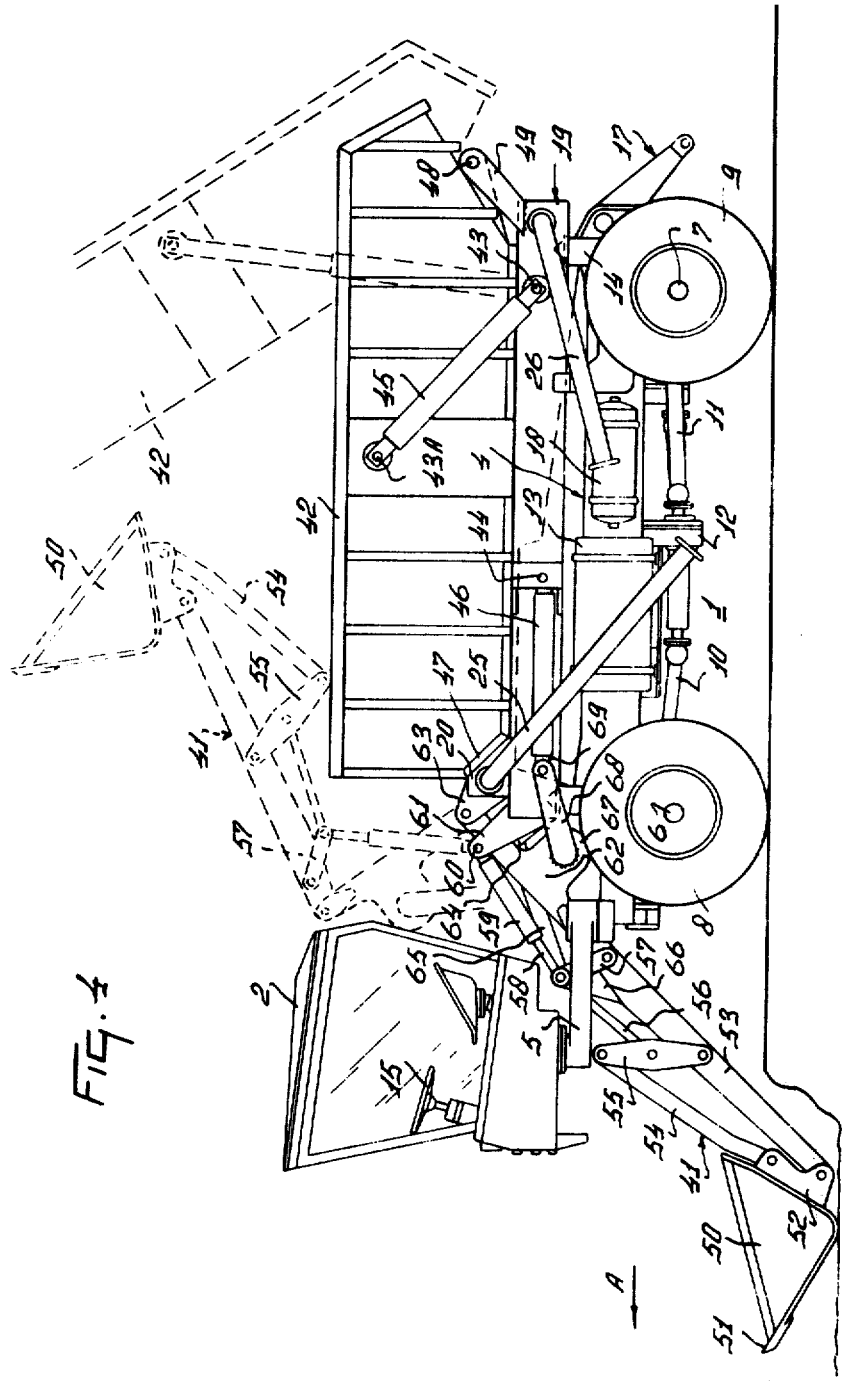

TRANSPORT DEVICES

The invention has for its object to provide a transport device of the kind set forth, which permits of extending the possibilities of use of the tractor itself. According to the invention the rotatable frame support is arranged for this purpose on a separate frame, which can be coupled with the tractor so that the loading surface, the machine or the implement and the rotatable frame support can be disengaged from the tractor, while the separate frame is provided with supports for holding the loading surface, the machine or the implement when the latter is discoupled from the tractor.

For a better understanding of the invention and to show how the same may be carried into effect, reference is made by way of example to the accompanying drawings.

FIG. 4 is a side elevation of a third embodiment of a transport device according to the invention.

Figure 1:
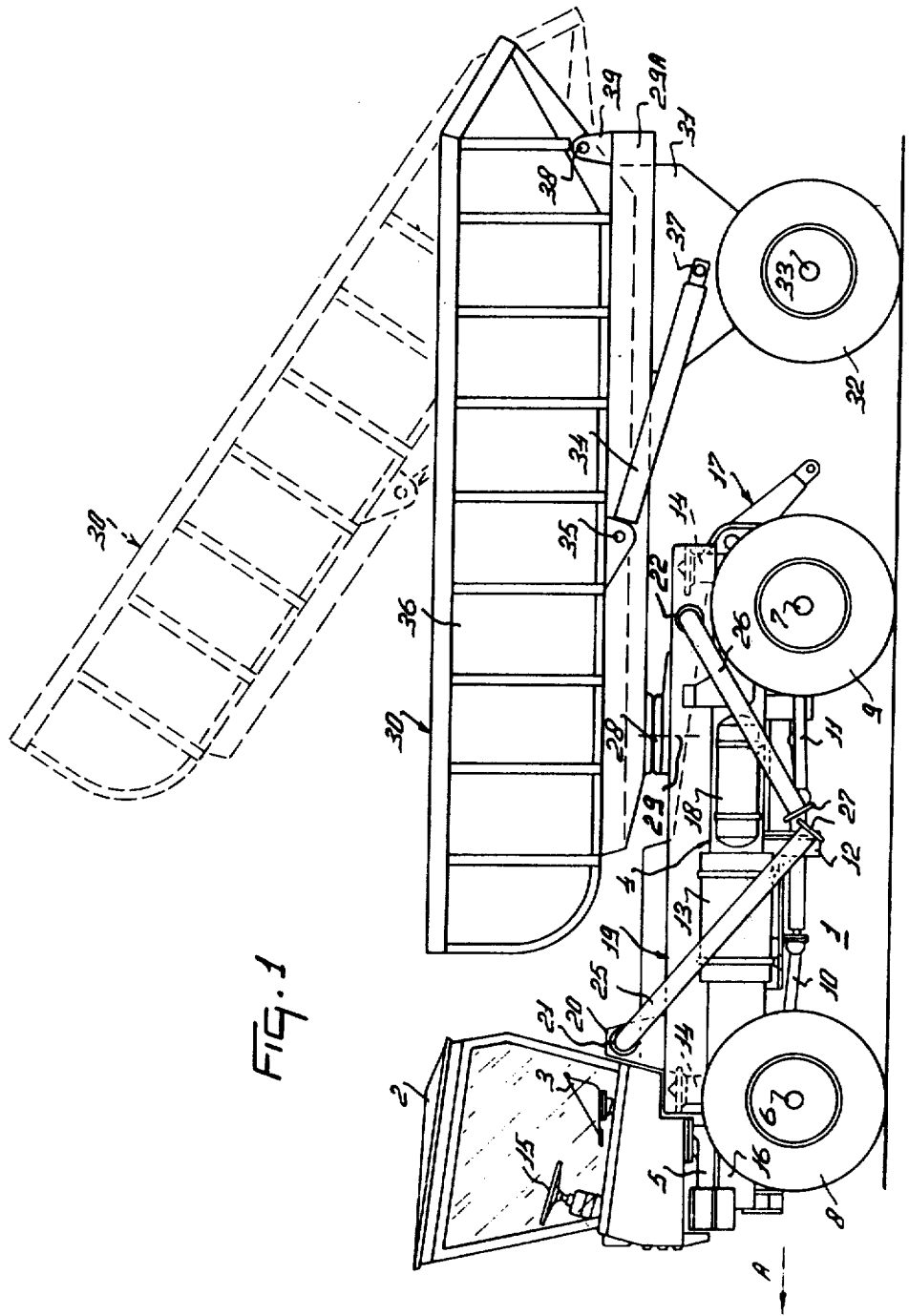
FIG. 1 is a side elevation of a transport device embodying the invention.

The transport device shown in FIG. 1 comprises a tractor 1, provided at the front with a drivers seat 3 enclosed by a cabin 2, the cabin being adapted to pivot with respect to the tractor frame 4 by means of an arm 5. The tractor 1 is furthermore provided with two axles 6 and 7, on each of which at least two tractor wheels 8 and 9 of the same size are arranged respectively. The front axle 6, like the rear axle 7, is connected via a differential gear (not shown) with driving shafts 10 and 11 respectively, which are linked via a trans-mission device 12 to the driving shaft of the engine 13. The tractor comprises furthermore at the front and at the rear near the wheel axles vertically operating, hydraulic jacks 14, which can be actuated from the cabin 2. Each jack is provided at the top with a locking mechanism (not shown), by means of which an implement, a machine or other device arranged on the tractor can be locked in position. Locking and unlocking are also performed from the driver's cabin 2. The cabin 2 comprises in known manner control-members such as a steering mechanism 15 and other regulating sets (not shown) for actuating the engine 13 and the drive derived therefrom and for actuating the lifting device 14 and turning the cabin 2. The arm 5, on which the cabin 2 is adapted to turn, bears on an extension arm 16, which extends over a given distance towards the front of the tractor and which is rigidly secured on the left-hand front side of the frame of the tractor 1. The tractor is furthermore provided at least on the rear side with a coupling and lifting device 17, with which the machine or the implement can be coupled and lifted and which machine or implement can also be driven by a power take-off shaft (not shown). In this preferred embodiment the tractor comprises an additional fuel tank 18 for increasing its capacity of travel. On the rear side of the cabin 2 a separate frame 19 is provided; in this preferred embodiment said frame is rectangular and made of channel-section profiles. The frame 19 has near the corners recesses for accommodating accurately the locking mechanisms (not shown) of the jacks 14 of the tractor 1, by means of which the frame 19 is secured to the top side of the tractor 1. At the front, the frame 19 has an elevated portion 20, in which a tube 21 is arranged, whereas on the rear side of the frame 19 a second tube 22 is secured in the frame itself. Shafts 23 and 24 respectively are adapted to slide axially in the tubes 21 and 22 respectively. The shafts 23 and 24 are provided with supports 25 and 26 respectively, which are provided with foot plates 27 at their ends remote from the connecting points on the shafts 23 and 24. In this preferred embodiment the supports 25 and 26 are displaceable in their direction of length. It should be noted that the axial displacement of the shafts 23 and 24, their rotation in the tubes 21 and 22 respectively and the variation in length of the supports 25 and 26 can be controlled from the cabin 2. The frame 19 comprises furthermore a rotatable frame support 28, the rotary shaft 29 of which is located at a distance equal to approximately one third of the length of said frame 19 from the rear side of the latter.

The term "rotatable frame support" is to be understood herein to include also a so-called "fifth wheel," coupling on which a different device such as a trailer, a machine or an implement can be at least partially held in a rotatable manner.

On the rotatable frame support 28 is arranged the frame 29A of a tiltable loading trough 36, forming part of a trailer 3. The frame 29A can be coupled with central coupling 28A (FIG. 2) to the support 28 on frame 19. The frame 29A is held, also by supporting plates 31 on an axle 33, having at least two wheels 32. The tractor wheels 8 and 9 and the wheels of the loading trough are preferably of the same size. The tiltable trough 36 comprises furthermore jacks 34, which are connected at one end with the trough 36 so as to be rotatable about horizontal pivotal shafts 35, which extend transversely of the direction of movement A and at the other end with the supporting plates 31 so as to be pivotable about horizontal shafts 37, extending transversely of the direction of movement A. Each jack 34 is also controlled from the cabin 2. The trough 36 itself is provided near its rear side with a horizontal pivotal shaft 38, extending transversely of the direction of movement A and journalled in supports 39, which form part of the frame 29A of the trailer 30.

Figure 2:
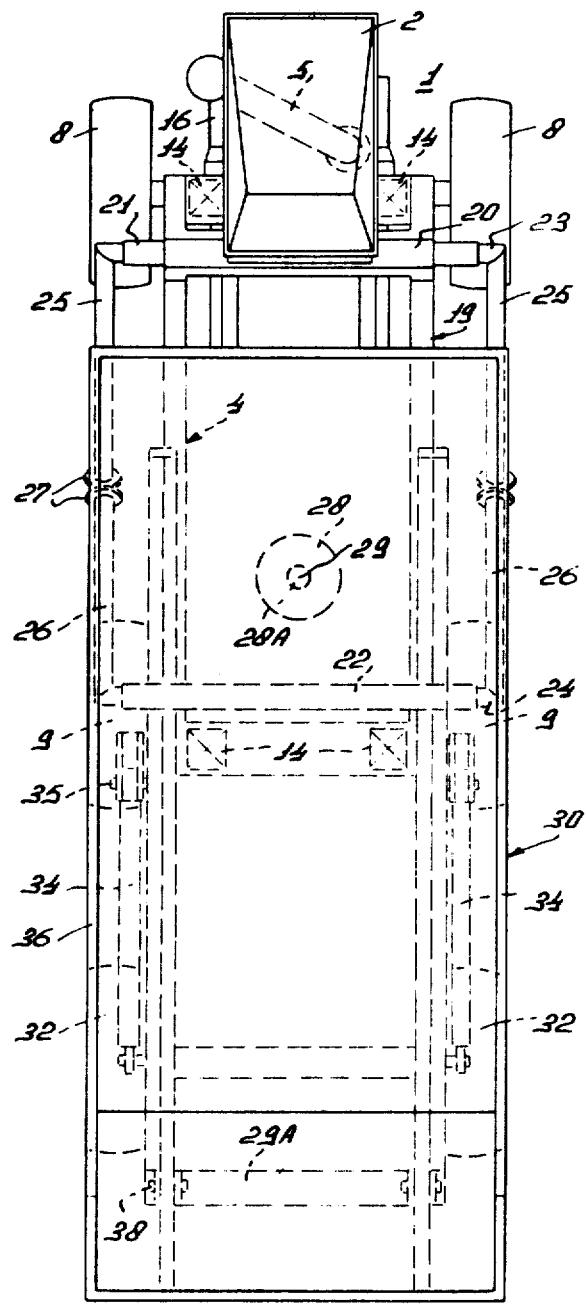
FIG. 2 is a plan view of the device of FIG. 1.

The device shown in FIGS. 1 and 2 operates as follows: By raising the pressure in the hydraulic cylinders 34 the trough 36 is pivoted around the shaft 38 into the position shown in the Figures by broken lines so that the contents of the trough 36 can be shed out of an opening that can be closed. Subsequently, by decreasing the pressure in the jack 34 the trough 36 is returned to its initial position.

It may be desirable to employ the tractor furthermore for different purposes. For this purpose the trailer is discoupled from the tractor 1 in the following manner. From the cabin 2 the jacks 14 are displaced upwardly; simultaneously the shafts 23 and 24 in the tubes 21 and 22 respectively are turned so that the supports 25 and 26 get into a vertical position. During their rotation the shafts 23 and 24 are shifted out of the tubes 21 and 22 respectively so that the supports 25 and 26 move beyond the tracks of the tractor wheels. Then the supports 25 and 26 are lengthened so that after the hydraulic pressure in the jacks 14 has disappeared and the frame 19 has been unlocked from the jacks 14 the frame 19 with the loading trough 30 coupled herewith gets free from the tractor at least at the front and bears on the supports 25 and 26, which are in contact with the ground. Since the supports are held on the ground beyond the tract of the tractor wheels, the tractor 1 or at least part of its frame can be moved from beneath the frame 19. It will be evident that the aforesaid manipulations have to be carried out in the reverse order for coupling the tractor with a tiltable loading trough or the like.

Figure 3:
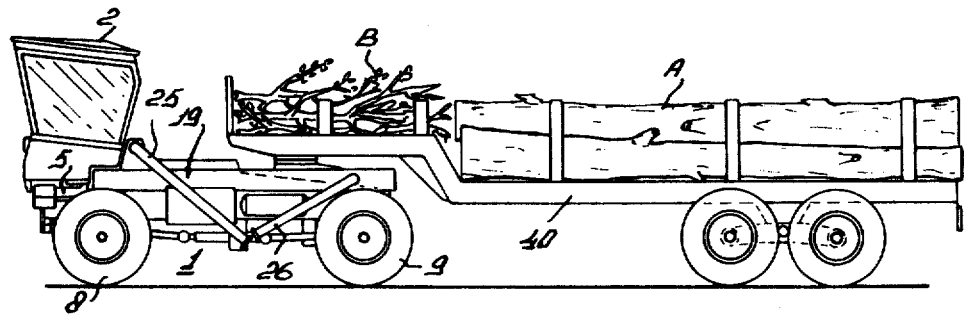
FIG. 3 is a side elevation of a second embodiment of a transport device according to the invention.

FIG. 3 shows a further embodiment of the transport device in accordance with the invention, in which the frame 19 has connected with it a trailer 40 having two tandem axles. The supporting part of the trailer is in this case at least twice the supporting part of the frame 19 located behind the cabin 2 of the tractor 1.

FIG. 4 is a side elevation of an embodiment of a transport device in which the frame 19 of the tractor 1 holds a loading device 41 and a tiltable loading trough 42. It should be noted that the parts corresponding with those of FIGS. 1 to 3 are designated by the same reference numerals. The cabin 2 is turned into its foremost position, it being simultaneously moved laterally with respect to the frame 4 so that in this state a space is formed at the side of the cabin 2 for the loading device 41, secured to the frame 4. In this embodiment the frame 19 is provided, viewed in the direction of length, on either side with fastening points 43 and 44 for jacks 45 and 46 respectively. These jacks can also be controlled from the pivotable cabin 2 through hydraulic ducts including quick-release couplings. By its front, a slightly bevelled portion 47 of the loading trough 42 bears on the elevated portion 20 of the frame 19 and at the rear the loading trough 42 is connected with upwardly inclined supports 49 of the frame 19 so as to be pivotable about a horizontal shaft 48, extending transversely of the direction of movement. The end part of the lifting cylinder 45 is pivotally connected to the trough 42 by means of an axis 43A. In the manner as described for the movable loading trough 30 of FIGS. 1 and 2 an increase in hydraulic pressure in the jack 45 will cause the trough 42 to turn about the shaft 48 into the position indicated by broken lines, whereas the trough 42 returns to its initial position by eliminating the hydraulic pressure. At the front of the frame 19 a loading device 41 comprises a shovel 50 having an edge 51 at the front, which is pivoted by means of a supporting member 52 to a beam 53. The supporting member 52 is furthermore pivoted to an auxiliary arm 54, extending parallel to the beam 53, viewed in the direction of travel A. By means of an arm 55 which is pivotally connected with the beam 53 said arm 54 is pivoted to one end of a rod 56 by means of a horizontal pivotal shaft, extending transversely of the direction of movement A, said shaft being located approximately midway between the pivotal shafts extending in the same direction between the arms 54 and 55 and the arm 55 and the beam 53 respectively. The other end of the rod 56 is pivoted to an auxiliary arm 57 of the beam 53 by means of a horizontal pivotal shaft, extending transversely of the direction of movement A. With said shaft a piston rod 58 of a jack 59 is coupled. The other end 60 of the jack 59 is pivoted between two supports 61, secured to the frame 19. The beam 53 is rigidly secured to an arm 62, which is pivoted, in turn, to a support 63 by means of a horizontal pivotal shaft extending transversely of the direction of movement A, said support 63 being secured to the portion 20 of the frame 19. At the front of the frame 19 a support 64 is arranged behind a support 61, viewed from aside. An arm 65 is pivoted to said support 64 by means of a horizontal, pivotal shaft extending transversely of the direction of movement A. Said arm 65 is furthermore coupled with a supporting member 66 of the beam 53. The arm 62 is provided with a fastening ear 67, to which a coupling arm 68 is secured, which is pivoted to the piston rod 69 of a jack 46 by means of a horizontal pivotal shaft extending transversely of the direction of movement A.

The transport device comprising the loading device shown in FIG. 4 operates as follows. After having established in the manner described above the coupling between the frame 19 with the loading trough 42 arranged on the frame and the loading device 41 secured to the frame 19, the cabin 2 being located at the side of the loading device 41 secured to the tractor 1, the device 41 can be driven to a site where, for example, soil, gravel or the like has to be dug up for being shed at a different place. For digging up soil by means of the loading device 41, which is also controlled from the cabin 2, the beam 53 is moved into its lowermost position by means of the jack 46 so that the shovel 50 bears on the ground. Then by means of the jack 59 the shovel 50 is tilted so that the edge 51 touches the ground and at the same time the pressure in the jack 56 is slightly increased so that the shovel 50 is driven into the soil. By the action of the jack 59 the shovel 50 driven into the soil is turned so that it is filled. Subsequently, the pressure in the jack 46 is further increased so that the beam 53 and the arm 62 are turned and the filled shovel is moved from the ground over the loading trough. The loading device has the advantage that the tractor driver can act upon the position of the shovel simply by varying the pressure in the jack 59, when the shovel 50 is moved from the ground over the loading trough 42. The driver need only watch the position of the shovel 50 so that during the turn of the shovel 50 no dug-up soil, gravel or the like will be spilt. The frame 19 with the loading device 41 and the loading trough 42 can be discoupled with the aid of the supports 25 and 26 in the same manner as described above with reference to FIGS. 1 and 2.

Figure 5:
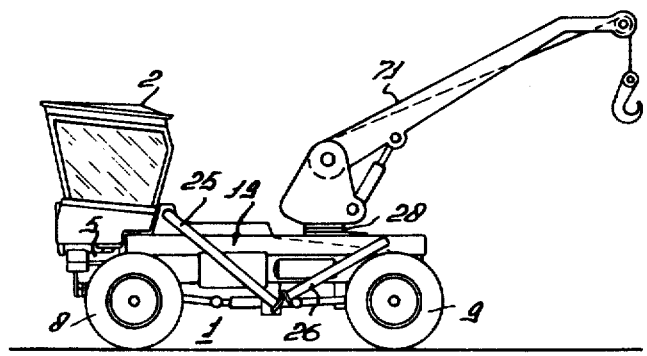
FIG. 5 shows the combination of the tractor of the transport device and a hoisting tool.

It will be obvious that the invention is not restricted to the combination of a tractor and a trailer and that instead of a trailer any more or less bulky machine or implement can be coupled with the frame 19 so that a unit is formed, which can be at least partly held by the tractor and be moved thereby. The tractor itself may otherwise be available for different operations. Such a combination is shown in FIG. 5, which shows that instead of a trailer or a loading trough a crane 71 is arranged on the rotatable frame support 28.

Having thus described my invention, what I claim as new and desire to secure by letters patent of the United States is:

1. A transport device comprising a tractor having a frame and a forward driver cabin, a horizontal loading area supported by said frame and located to the rear of said cabin, a rotatable support on a separate frame being detachably mounted on said loading area, said separate frame being positionable to at least partially overlie said area and said first mentioned frame, said support comprising a fifth wheel having a shaft for coupling an implement frame means to said separate frame, whereby said implement frame means is displaceable with respect to said shaft, said separate frame having displaceable supporting elements that straddle said loading area and which are movable to ground supporting positions to hold the separate frame, rotatable support and attached implement apart from said tractor and above said loading area, whereby said tractor can be separated from the remainder of the device, said first mentioned frame having a plurality of front and rear lifting jacks that are received by said separate frame to connect same to the top side of said first mentioned frame.

2. A transport device as claimed in claim 1, wherein said separate frame extends over to overlie more than half the loading area of the tractor.

3. A transport device as claimed in claim 1, wherein said separate frame is rectangular and said jacks are located at the corners of the separate frame.

4. A transport device as claimed in claim 3, wherein said tractor has front and rear wheels and the length of said separate frame is approximately equal to the distance between the axle of the front wheels and the axle of the rear wheels.

5. A transport device as claimed in claim 1, wherein said supporting elements are located adjacent the corners of said separate frame.

6. A transport device as claimed in claim 5, wherein said supporting elements are ground supports and hydraulically displaceable both vertically and in a direction transverse of the direction of normal movement of said device.

7. A transport device as claimed in claim 6, wherein said supporting elements are rotatably journalled in said separate frame.

8. A transport device as claimed in claim 7, wherein said supporting elements have front and rear fastening points on said separate frame and include foremost fastening points which are located at a higher level than hindmost fastening points.

9. A transport device as claimed in claim 8, wherein said supporting elements are relatively displaceable on said separate frame to a ground supporting position whereby said tractor is freely movable between them.

10. A transport device as claimed in claim 1, wherein said cabin is displaceably connected to said tractor with pivotable arms.

11. A transport device as claimed in claim 1, wherein said tractor has four ground wheels of the same size, and said jacks are hydraulically operated lifting jacks supported on said first mentioned frame so that a lifting jack is positioned adjacent each wheel.

12. A transport device as claimed in claim 1, wherein at least the rear side of said tractor is provided with coupling and lifting means.

13. A transport device as claimed in claim 1, wherein said rotatable support is secured to a trailer implement comprising a tiltable loading trough.

* * * * *